United States Patent [19]

Peterson

[11] 4,239,061
[45] Dec. 16, 1980

[54] DAMPER VALVE

[75] Inventor: Harley G. Peterson, La Crescenta, Calif.

[73] Assignee: Joy Manufacturing Company, Pittsburgh, Pa.

[21] Appl. No.: 810,657

[22] Filed: Jun. 27, 1977

[51] Int. Cl.³ .......................... F16K 1/00; B01D 46/42
[52] U.S. Cl. .................. 137/614.11; 251/210; 55/314; 55/341 R
[58] Field of Search .............. 137/614.11, 240, 625.33, 137/625.34, 625.36, 627.5; 251/210; 55/314, 341 R

[56] References Cited

U.S. PATENT DOCUMENTS

| 245,862 | 8/1881 | Rinderknecht | 137/625.34 |
| 397,672 | 2/1889 | Tonge | 137/625.36 |
| 558,702 | 4/1896 | Perkins | 137/613 |
| 788,079 | 4/1905 | Wheeler | 137/614.11 |
| 1,843,953 | 2/1932 | McKinney | 137/625.34 |
| 2,221,100 | 11/1940 | Lear | 251/210 |
| 2,351,140 | 6/1944 | McCloy | 137/614.11 |
| 3,895,651 | 7/1975 | Okada et al. | 137/614.11 |
| 3,975,173 | 8/1976 | Peterson et al. | 55/96 |
| 4,103,708 | 8/1978 | Huntingdon | 137/614.11 |

FOREIGN PATENT DOCUMENTS

| 1353573 | 1/1964 | France | 137/614.11 |
| 14487 | of 1889 | United Kingdom | 137/614.11 |
| 16770 | of 1896 | United Kingdom | 137/614.11 |
| 10511 | of 1913 | United Kingdom | 137/614.11 |

Primary Examiner—Martin P. Schwadron
Assistant Examiner—A. Michael Chambers
Attorney, Agent, or Firm—J. Stewart Brams

[57] ABSTRACT

A damper valve and more particularly an improved damper valve including purge means for the prevention of leakage therepast.

8 Claims, 3 Drawing Figures

DAMPER VALVE

BACKGROUND OF THE INVENTION

In the art of damper valves of the type used to control the flow of gas in a gas conducting flue such as the flue of a coal burning power plant it is well known to provide a purged damper for such purposes as bypassing a portion of the flue. For example in flue gas cleansing systems such as baghouse filters and the like purged bypass dampers have often been provided to connect a portion of the flue upstream from the filter with a portion of the flue downstream from the filter whereby the gas passing through the flue may be selectively caused to either bypass or pass through the filter by selective opening and closing of the bypass damper. Purging of such bypass dampers as by pressurized gas precludes any leakage of flue gas past the bypass damper when closed. Leakage is especially undesirable in flue gas filtering systems in that it permits dirty flue gas flowing in the upstream flue portion to leak over into the clean gas stream flowing in the downstream portion of the flue thus reducing overall filter operating efficiency and system reliability.

Although prior purged dampers have generally served their intended purposes they have nevertheless often been subject to troublesome deficiencies. For example, prior dampers such as the guillotine or butterfly types have often included a pair of spaced apart valve members rather than a single valve member and the operating mechanism for such dampers has often been rather more complex than that of a single valve member. The added need in such dampers for a conduit means to deliver purging gas thereto has further complicated prior bypass damper structures. Additionally, many prior purged dampers have not been well adapted for use in a valved passage comprised of an opening in a common wall between adjacent countercurrent flow flue portions.

The hereinabove cited deficiencies of prior purged dampers are overcome by the present invention according to which there is provided a gas purged poppet or domed head type damper valve which includes a pair of spaced apart domed disc-like valve heads. The operating mechanism of the damper of this invention is substantially no more complex than that of a single head poppet type valve, and the structure of the present invention may be further simplified by having the purge gas inlet means constructed integrally with the actuating mechanism of the damper. Furthermore, the damper of this invention is quite well suited for use either in an elongated duct or flue portion or in a valved gas flow passage comprised substantially of an opening in a common wall between separate flue or duct portions. The invention is particularly well suited to use in a bypass portion of a gas flue.

DESCRIPTION OF THE INVENTION

These and other objects and advantages of the invention are more fully specified in the following description with reference to the accompanying figures in which.

Figure 1:
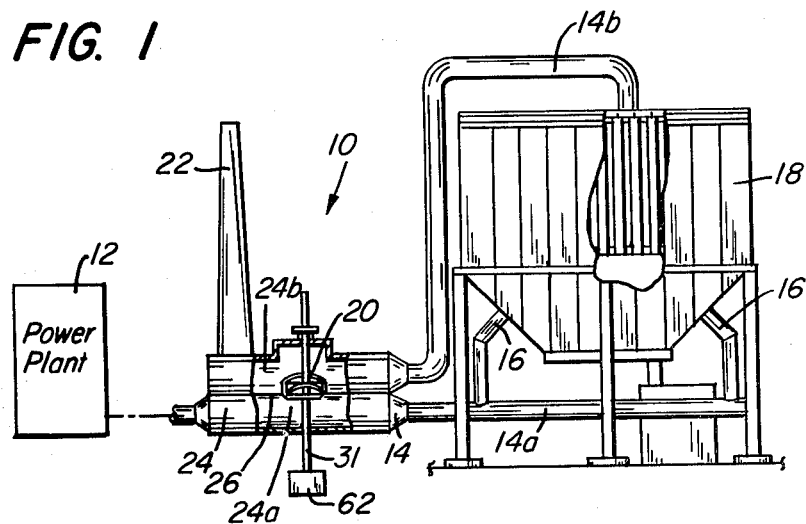
FIG. 1 is a schematic side elevation of a flue gas treatment system including damper valve means of the present invention.

There is generally indicated at 10 in FIG. 1 a gas treatment and disposal system having a flue 14 which includes damper valve means 20 constructed according to one embodiment of the instant invention. The system 10 may be any of a variety of gas treatment means, for example a conventional baghouse filter system for the flue gases of a coal burning power plant 12. The plant 12 and gas treatment system 10 are shown in simplified, generally schematic format purely for purposes of illustration. Such simplification is not intended to unduly limit the scope of the invention described.

Figure 2:
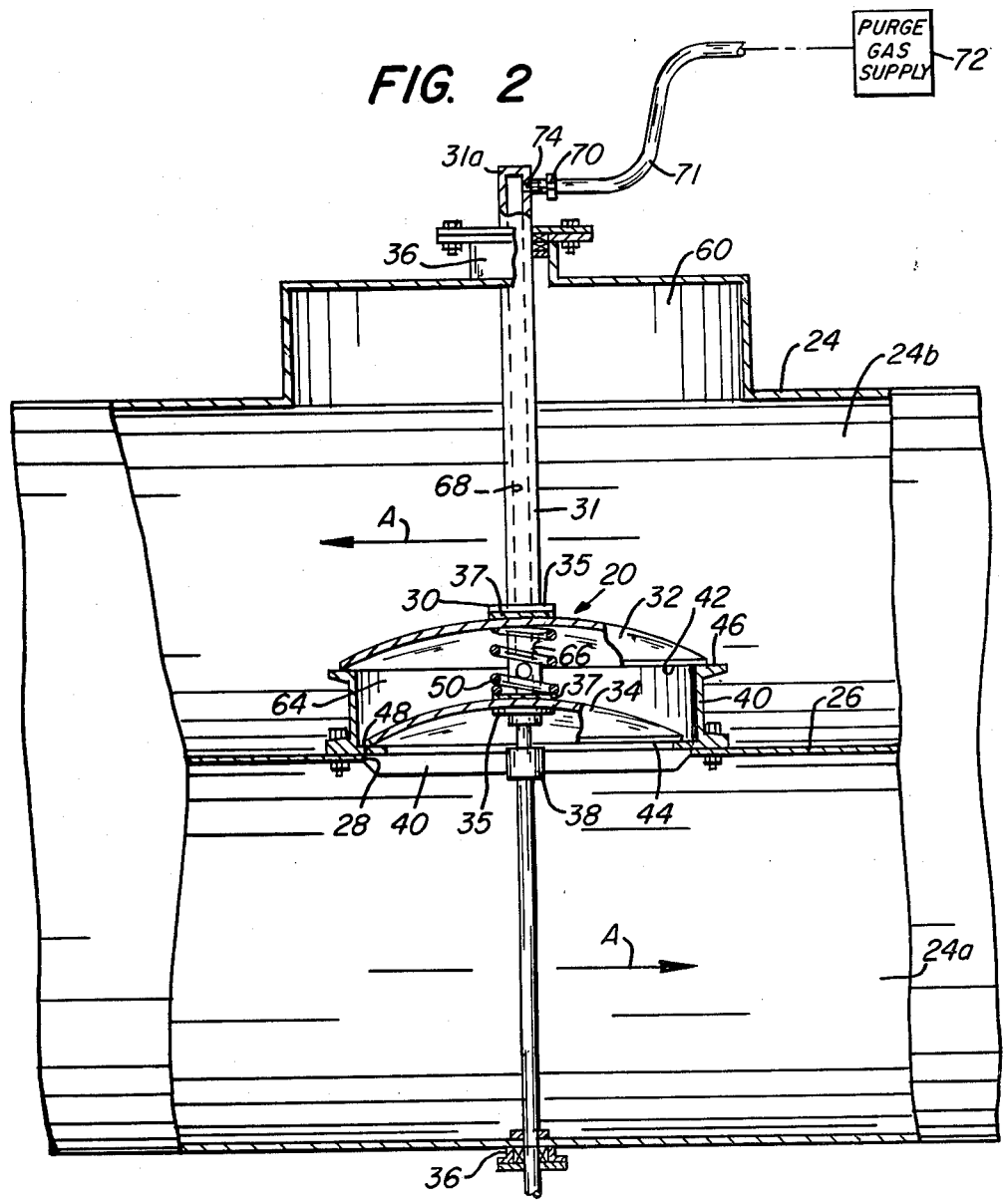
FIG. 2 is a fragmentary portion of FIG. 1 illustrating the damper means of this invention.

In practice the flue gas from plant 12 is directed via flue 14 through an inlet flue portion 14a to the inlet 16 of a baghouse filter 18 and thence from baghouse 18 to a stack 22 by way of an outlet flue portion 14b. As shown in FIGS. 1 and 2, a part of inlet flue portion 14a and outlet flue portion 14b is formed as an enclosure or duct 24 having an interior wall 26 which divides the interior of the duct 24 into countercurrent duct portions 24a, 24b which communicate in gas flow conducting relationship with inlet and outlet flue portions 14a, 14b respectively. Flue gas from plant 12 passes successively through duct portion 24a and flue portion 14a enroute to baghouse 18 and through outlet flue portion 14b and duct portion 24b enroute to stack 22 for expulsion to the atmosphere. Accordingly, the normal direction of gas flow in duct portions 24a, 24b is as indicated by arrows A in FIG. 2.

The damper valve 20 is carried by duct 24 in a manner to be described hereinbelow for selectively opening and closing of a bypass aperture 28 formed in wall 26 by the selective disengaging and engaging of a generally annular damper seating member 40 which is rigidly sealingly secured to wall 26 coaxially adjacent aperature 28. When aperature 28 is closed the flue gas is passed through baghouse 18 in a manner hereinabove described. When aperature 28 is open the flue gas passes from duct portion 24a via aperature 28 into duct portion 24b and thence to stack 22 thus bypassing baghouse 18. Bypass operation may be required by such circumstances as periodic cleaning or maintenance of the baghouse 18.

As shown in FIG. 2 damper 20 comprises a valve assembly 30 including an elongated, rigid support and actuator member 31 having mounting coaxially intermediate the axial ends thereof a pair of axially spaced apart domed damper plates or heads 32, 34 fabricated in generally spherical form from any suitable material, sheet steel for example. Each of heads 32, 34 includes a coaxial opening through which member 31 passes and the heads 32, 34 are thus captively retained in coaxially surrounding relation with member 31 by a pair of axially spaced, radially outwardly extending stops 35 rigidly coaxially affixed intermediate the axial ends of member 31. A preloaded spring bias member such as helical spring 50 extending coaxially intermediate heads 32, 34 urges the heads 32, 34 axially apart and into biased engagement with stops 35. Generally annular sealing or gland members 37 such as elastomer, fiber or leather seals are captively retained in coaxial surrounding relation with member 31 adjacent each head 32, 34 by the bias of spring 50 to preclude leakage of gas through the openings in heads 32, 34 through which member 31 passes. Guide member 31 is axially slidably carried by plural, coaxially spaced bearing means such as glands 36 rigidly affixed adjacent opposite exterior walls of duct 24 and coaxially aligned with aperature 28, and a coaxially intermediate guide bearing 38 which is carried by an elongated support bar 40 that extends transversely adjacent aperature 28. Member 31 extends coaxially through glands 36 and bearing 38 and outwardly of duct 24 whereby the entire assembly 30 is coaxially movable with respect to aperature 28 and seating member 40. As shown in FIG. 2 the heads 32, 34 are oriented such that the concavity thereof faces in the direction of valve closing such that when member 31 is moved toward closure or downward in FIG. 2 a peripheral edge portion 42, 44 of each head 32, 34 seats upon a respective, annular seating portion 46, 48 of member 40 to define a sealed interface thereat. As heads 32, 34 are moved into closed engagement head 34 is first to engage its seat 48 whereupon further movement of member 31 causes head 34 to move relatively upwardly or toward head 32 against the bias of spring 50. Immediately subsequent to the seating of head 34 and preferably after minimal displacement thereof with respect to member 31, head 32 seats on seat 46 to provide a second sealed interface for damper closure. For opening of damper 20 member 31 is moved in the opposite axial direction or upwardly to disengage heads 32, 34 from respective seats 46, 48 and displace them upward into an outwardly extending recess 60 of duct 24. Recess 60 permits heads 32, 34 to be moved substantially completely out of the flow path of gas passing through duct portion 24b thus minimizing interference with such gas flow. Any suitable operating mechanism such as a fluid operable piston cylinder arrangement or a lead screw device (neither shown) may be employed to drive assembly 30 in its axial travel for opening and closing damper 20. Preferably the drive means is located externally of duct 24 and operatively engages only an externally protruding portion of member 31 as shown schematically at 62 in FIG. 1.

In order to ensure against gas leakage through aperature 28 between duct portions 24a, 24b, damper 20 is purged as follows. When damper 20 is closed a generally annular space 64 is defined radially inwardly of seat member 40 and axially intermediate heads 32, 34. A purging gas is injected into space 64 at a pressure at least equal to and preferably greater than that of the gas in duct portions 24a, 24b. Preferably the purge gas is delivered to space 64 by way of at least one radially extending bore 66 in member 31 which communicates space 64 with an axially extending blind passage 68 in member 31. Passage 68 extends within member 31 into an upper end portion 31a thereof located externally of duct 24, and a flexible fluid flow conduit 71 is connected to portion 31a by any suitable fluid coupling means 70 to communicate via a radial bore 74 with passage 68. Pressurized gas from any suitable source, shown schematically at 72, is thus conducted via conduit 71, bore 74, passage 68 and bore 66 into space 64. Through the supplying of purge gas under pressure to space 64 as described relatively high pressure is maintained within space 64 thus resisting any leakage of flue gas between duct portions 24a, 24b. That is, leakage across the seat of heads 32, 34, if any, will result in purge gas flow from space 64 into the respective duct portion 24a, 24b. Of course the purge gas inlet passage to space 64 may be any suitable conduit means with or without portions thereof extending in the support member 31.

Figure 3:
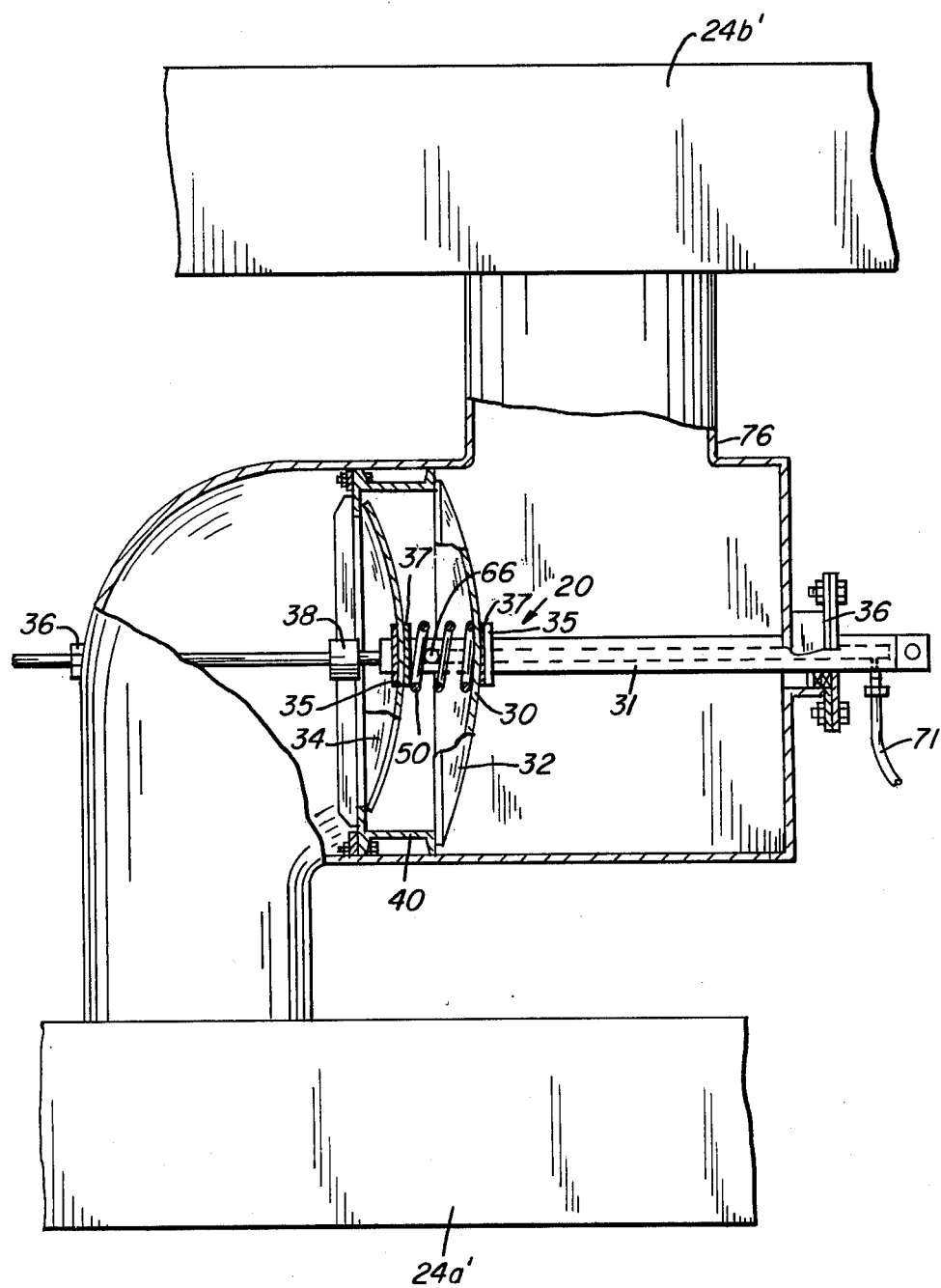
FIG. 3 is a view similar to FIG. 2 illustrating an alternate embodiment of the invention.

In an alternate embodiment as shown in FIG. 3 damper 20 is installed in an elongated bypass duct 76 which communicates in gas flow conducting relation between upstream and downstream flue portions 24a', 24b' corresponding to the respective duct portions 24a, 24b of FIG. 2. Inasmuch as damper 20 in the embodiment of FIG. 3 is entirely similar in structure and operation to the damper embodiment of FIGS. 1 and 2, detailed description of the FIG. 3 embodiment is not necessary. The reader is referred to the description hereinabove for details of the embodiment of FIG. 3.

According to the description hereinabove the present invention provides an improved poppet or domed head type damper valve including purge means to resist leakage across the valve. The damper of this invention provides simplified construction and improved versatility over prior purged dampers, among other advantages.

Notwithstanding the description hereinabove of a particular preferred embodiment of the invention it is to be understood that this invention may be practiced in numerous alternative embodiments with various modifications thereto without departing from the broad spirit and scope thereof. For example the described damper valve may be employed in various installations other than combustion gas flues and for other purposes than a bypass function; various valve operating mechanisms and pressurized gas sources may be employed; the invention may be used as a valve between two otherwise independent and unrelated gas flow passages rather than between portions of a single gas conducting means; the valve heads and elongated actuator may be fixed and the seat member relatively axially movable with respect thereto to effect closure of the damper; purge gas may be delivered to space 64 by means independent of actuator 31; and the like.

These and other embodiments and modifications having been envisioned and anticipated by the inventor, the invention should be interpreted as broadly as permitted by the scope of the claims appended hereto.

What is claimed is:

1. In an elongated gas flow conducting means including valved aperture means for selectively controlling gas flow therewithin, a damper valve means comprising:

Valve seat means associated with such aperture means and including at least a pair of seat portions spaced apart in the direction of gas flow through said conducting means; a valve actuator assembly including an elongated support extending within said gas flow conducting means along an axis and axially moveable with respect to said seat portions; said actuator assembly including a valve head assembly having at least a pair of axially spaced damper valve head means carried by said elongated support and each engageable with a respective one of said seat portions and bias means cooperable with said head means and stop means on said elongated support to permit axial movement of both of said head means with respect to each other axially of said support, and said seat portions being cooperable with said valve head assembly to effect sequential engagement of said head means with the respective said seat portions upon such selective axial movement of said support means to close said conducting means to interrupt gas flow within said gas flow conducting means by forming a respective pair of sealed interfaces.

2. A damper valve as claimed in claim 1 wherein the maximum axial distance between said pair of head means is defined by the locations of a pair of axially spaced stops comprising said stop means and each of said pair of head means is retained axially adjacent a respective one of said pair of stops by said bias means extending axially intermediate said pair of head means.

3. A damper valve as claimed in claim 1 wherein said seat portions and said pair of head means are generally symmetrical about the longitudinal axis of said elongated support.

4. A damper valve as claimed in claim 3 wherein each of said pair of head means includes a continuous, generally circular peripheral portion which is engageable with the respective said seat portion to define one of said sealed interfaces.

5. A damper valve as claimed in claim 1 wherein said gas flow conducting means includes an elongated gas flow path and said aperture means comprises a bypass aperture formed in a common wall separating relative upstream and downstream portions of said path.

6. A damper valve as claimed in claim 5 wherein said upstream and downstream portions of said path are respective upstream and downstream portions of a flue for, respectively, delivering flue gas to and conveying flue gas from a flue gas treatment means.

7. A damper valve means as claimed in claim 1 additionally including means for delivering purge gas to act on said sealed interfaces in a manner to resist leakage of the gas in such gas flow conducting means across said sealed interfaces.

8. A damper valve means as claimed in claim 1, wherein said pair of seat portions are spaced apart along the axial extent of said elongated support such that when said head means are positioned to engage the respective said seat portions; at least one of said head means is located axially intermediate said pair of seat portions; and said head means being axially movable from engagement with the respective said seat portions to a position whereat neither of said head means is located axially intermediate said pair of seat portions.

* * * * *